(12) United States Patent
Thorwarth (10) Patent No.: US 10,427,255 B2
(45) Date of Patent: Oct. 1, 2019

(54) PRODUCTION PLANT, PRODUCTION DEVICE AND PRODUCTION METHOD

(71) Applicant: KUKA Systems GmbH, Augsburg (DE)

(72) Inventor: Paul Thorwarth, Augsburg (DE)

(73) Assignee: KUKA Systems GmbH, Augsburg (DE)

(*) Notice: Subject to any disclaimer, the term of this patent is extended or adjusted under 35 U.S.C. 154(b) by 0 days.

(21) Appl. No.: 15/552,004

(22) PCT Filed: Feb. 19, 2016

(86) PCT No.: PCT/EP2016/053562
§ 371 (c)(1),
(2) Date: Aug. 18, 2017

(87) PCT Pub. No.: WO2016/131961
PCT Pub. Date: Aug. 25, 2016

(65) Prior Publication Data
US 2018/0029178 A1    Feb. 1, 2018

(30) Foreign Application Priority Data

Feb. 19, 2015  (DE) .................... 20 2015 100 782 U
Nov. 27, 2015  (DE) .................... 20 2015 106 459 U (51) Int. Cl.
*B23P 23/06*          (2006.01)
*B23P 21/00*          (2006.01)
(Continued)

(52) U.S. Cl.
CPC ............ *B23P 23/06* (2013.01); *B23P 21/004* (2013.01); *B62D 65/022* (2013.01);
(Continued)

(58) Field of Classification Search
CPC ...... B23P 23/06; B23P 21/004; B62D 65/022; G05B 19/41805; Y02P 90/04; Y02P 90/12; Y02P 90/265; Y02P 90/28
See application file for complete search history.

(56) References Cited

U.S. PATENT DOCUMENTS 4,894,908 A    1/1990  Haba, Jr. et al.
5,027,502 A    7/1991  Sakamoto et al.
(Continued)

FOREIGN PATENT DOCUMENTS

AT         406030 B      1/2000
DE         142162 A1     6/1980
(Continued)

OTHER PUBLICATIONS

European Patent Office; Search Report and Written Opinion in International Patent Application No. PCT/EP2016/053562 dated Jun. 17, 2016; 18 pages.
(Continued)

*Primary Examiner* — Bayan Salone
(74) *Attorney, Agent, or Firm* — Dorton & Willis, LLP (57) ABSTRACT

A production plant for vehicle body components includes a production area with a plurality of automatic program-controlled production devices and a provision for workpieces. The production plant further includes a provision for various application-specific tools and a conveying device that flexibly connects the production devices to one another and to the external provisions.

25 Claims, 8 Drawing Sheets

(51) Int. Cl.
  *G05B 19/41* (2006.01)
  *B62D 65/02* (2006.01)
  *G05B 19/418* (2006.01)
(52) U.S. Cl.
  CPC .... *G05B 19/41805* (2013.01); *B23P 2700/50* (2013.01); *G05B 2219/31036* (2013.01); *G05B 2219/50393* (2013.01); *Y02P 90/04* (2015.11); *Y02P 90/12* (2015.11); *Y02P 90/265* (2015.11); *Y02P 90/28* (2015.11)

(56) References Cited

U.S. PATENT DOCUMENTS

| | | | | |
|---|---|---|---|---|
| 5,065,526 | A * | 11/1991 | Breyer | G01B 5/0014 33/503 |
| 6,519,837 | B1 | 2/2003 | Ichikawa et al. | |
| 2009/0311065 | A1* | 12/2009 | Gaudette | B65D 19/44 410/117 |
| 2012/0297614 | A1* | 11/2012 | Kilibarda | B23K 37/047 29/795 |
| 2012/0304446 | A1* | 12/2012 | Kilibarda | B23P 21/004 29/430 |
| 2015/0066164 | A1* | 3/2015 | Hogendoorn | G05B 19/4183 700/79 |

FOREIGN PATENT DOCUMENTS

| | | |
|---|---|---|
| DE | 158371 A1 | 1/1983 |
| DE | 3408720 A1 | 9/1985 |
| DE | 3536014 A1 | 4/1986 |
| DE | 202005001780 U1 | 6/2006 |
| DE | 102005042179 A1 | 3/2007 |
| DE | 102005059426 A1 | 6/2007 |
| DE | 102008009995 A1 | 8/2009 |
| DE | 202008012602 U1 | 3/2010 |
| DE | 202009005237 U1 | 1/2011 |
| EP | 0933161 A1 | 8/1999 |
| EP | 1120189 A1 | 8/2001 |
| EP | 2100804 A1 | 9/2009 |
| EP | 2554459 A1 | 2/2013 |
| FR | 2757819 A1 | 7/1998 |
| JP | H7299705 A | 11/1995 |
| JP | H11058185 A | 3/1999 |
| WO | 2012166775 A1 | 12/2012 |

OTHER PUBLICATIONS

International Bureau of WIPO; International Preliminary Report on Patentability in parent International Patent Application No. PCT/EP2016/053562 dated Aug. 31, 2017; 7 pages.
German Patent Office; Search Report in related German Patent Application No. 20 2015 100 782.5 dated Dec. 8, 2015; 5 pages.
German Patent Office; Search Report in related German Patent Application No. 20 2015 106 459.4 dated Oct. 11, 2016; 2 pages.
European Patent Office; Search Report and Written Opinion in related International Patent Application No. PCT/EP2016/078012; 11 pages.

* cited by examiner

PRODUCTION PLANT, PRODUCTION DEVICE AND PRODUCTION METHOD

CROSS-REFERENCE

This application is a national phase application under 35 U.S.C. § 371 of International Patent Application No. PCT/EP2016/053562, filed Feb. 19, 2016 (pending), which claims the benefit of German Patent Application No. DE 10 2015 106 459.4 filed Nov. 27, 2015 and German Patent Application No. 20 2015 100 782.5 filed Feb. 19, 2015, the disclosures of which are incorporated by reference herein in their entirety.

TECHNICAL FIELD

The invention relates to a manufacturing device having the features in the preamble of the main device and method claims.

BACKGROUND

Manufacturing facilities for the body shell of vehicle bodies, in which the manufacturing zone is divided into two or more separate lines in which manufacturing cells are interlinked by a conveyor system, are known in the field. The sequence of manufacturing steps and the manufacturing cells involved in it is firmly established. The workpieces are transported from cell to cell primarily by handling robots. These manufacturing facilities can be configured flexibly for different types of vehicle bodies, wherein the fixed interlinking remains in place.

The problem addressed by the present invention is that of indicating improved manufacturing technology.

SUMMARY

The invention solves this problem with the features of the apparatus and methods described herein.

The automated manufacturing technology is distinguished by a high level of flexibility. The manufacturing systems disposed in the manufacturing zone, preferably in the form of manufacturing cells, are themselves highly flexible and can be employed for a wide variety of applications. The application-specific tools required for this can be kept in an external supply and can be brought to the manufacturing systems by a conveying mechanism as needed in order to automatically equip and switch the tools of the system. The same conveying mechanism can also be used to transport the workpieces.

The manufacturing systems of the automated manufacturing facility are interlinked by conveyor technology in a way that is flexible and can be reconfigured as required so that they are linked both to each other and to supplies, particularly for various application-specific tools and for different workpieces.

The application manufacturing systems and their manufacturing devices, which can be applied flexibly across applications, are provided with workpieces and application-specific tools by the conveying mechanism. They can be adapted to different applications as a result of automatic changeable equipping with various application-specific tools and a program modification. This adaptability effects different production processes and/or various workpieces.

This type of adaptation makes it possible for a wide range of different production processes to be selectively carried out in a manufacturing system. Production processes of this kind include e.g. joining processes, in particular welding, soldering or adhering processes, shaping processes, assembly processes, attachment processes or the like. The reconfiguration of processes and tools can be carried out very quickly and easily.

An application-related adaptation also makes it possible to process different workpieces. The workpieces can be of any given type and size. They can be completely different. They can also be similar to each other and differ by type. Workpieces of this kind can be side walls or other components of vehicle bodies, for example, which differ in terms of their configuration for different types of bodies, e.g. for a limousine, a coupé, a delivery van or the like.

The highly flexible conveying mechanism can be configured in any suitable way. It preferably comprises a multitude of autonomous and individually controllable conveying means, which move on a multitude of different conveying paths. Preferably, a network of conveying paths is provided, on which the conveying means travel on predetermined conveyor tracks between the manufacturing systems and supplies, wherein the conveyor tracks can be freely selected and programmed. Moreover, the conveying mechanism is flexible with regard to the transport possibilities for application-specific tools and for workpieces.

Adapted load suspension devices are provided for this purpose. Multiple different types (A, B, C, D) of load suspension devices can be provided to adapt to different types of workpieces and/or tools. These can possibly include a detectable type identifier to differentiate them. The type identifier can be used for process adaptation in a manufacturing system. The load suspension devices can be permanently or interchangeably attached to the conveying means.

The conveying means and/or the load suspension devices can likewise be stored in one or more supplies and can be retrieved and employed as needed.

The different supplies for application-specific tools, for workpieces and for load suspension devices can be configured identically to one another and have a storage zone and a loading zone, which is linked to the conveying mechanism, as well as a loading mechanism, preferably one or more handling robots.

The manufacturing systems are preferably arranged insularly throughout the manufacturing zone and are surrounded on multiple sides, preferably on all sides, by conveying paths. In this way, a conveying path can lead into and preferably through a manufacturing system. The conveying means with the application-specific tools and/or workpieces can thus be brought directly into the manufacturing system and to the work station there.

The conveying path preferably extends through the work station. The conveying path can be traversed by a conveying means in one or preferably in both directions. Conveying means can deliver workpieces and/or tools to the work station on the conveying path and can then remove them from there or transport them through the manufacturing system. The conveying means can also pass through the manufacturing system for other purposes. A continuous conveying path can be used to interlink a plurality of manufacturing systems.

The conveying path is preferably arranged close to the floor, in particular attached to the floor. Conveying means that are likewise preferably floor-bound, and preferably autonomous vehicles, travel on the conveyor path. They can be individually controlled and steered, if applicable.

The workpieces are processed and the tools are equipped by means of distributed manufacturing devices, in particular robots, that can be applied flexibly across applications. The manufacturing devices can also carry out the reconfiguration of the tools. The application-specific tools that are repeatedly required during the manufacturing process can be stored in one or more storage areas, in particular storage carousels, and can be used and exchanged by the manufacturing device as needed. This type of application-specific tools can be e.g. handling and in particular gripping tools, which are adapted to different workpieces. On the other hand, various process tools, in particular joining tools, shaping tools or the like, can be provided for the various aforementioned processes.

The processing of workpieces can be carried out on the load suspension device, which can be appropriately positioned in a prescribed position for this purpose. The load suspension device can remain connected to the conveying means here or be separated from it. The workpiece processing can also take place separately from the load suspension device, wherein e.g. a handling robot retains one or more workpieces in a suspended position with its gripping tool for processing with one or more other robots. A workpiece can also be deposited on a repository near the work station, e.g. directly above the work station. This permits an exchange of the load-carrying equipment and the conveying means during the workpiece processing, which can be utilized for different purposes.

An independent inventive idea relates to a program-controlled automatic manufacturing system for workpieces, in particular components of a vehicle body, wherein the manufacturing system includes a plurality of manufacturing devices, in particular robots, distributed around a work station, wherein the manufacturing system is designed for a primary process and is linked with a further manufacturing system for a secondary process on a workpiece. A further independent inventive idea relates to a manufacturing process and a manufacturing facility having this kind of manufacturing system. The independent inventions can be employed with other conventional manufacturing systems, manufacturing processes and manufacturing facilities.

It is also advantageous when multiple adapted load suspension devices for workpieces are provided. The load suspension devices can be present in different types, which are themselves adapted to different types of workpieces. The load suspension devices can be transported into and away from the manufacturing system by a conveying means. The conveying means and the conveying mechanism can be configured according to the embodiments.

The further manufacturing system serves as an extension. For example, processes can be carried out here that are not possible or very difficult in the application-flexible manufacturing system. Multiple other manufacturing systems can be linked with the primary manufacturing system in a quadrant matrix. Furthermore, the cycle time can be shortened and the manufacturing output can be increased by diversifying and performing a plurality of processes simultaneously. The exchange of workpieces can take place via interfaces in the edge region of the manufacturing systems. The interfaces can be located on a protective partition surrounding each manufacturing system. The interfaces located on the conveying path can be configured as portals in the protective partition for empty and loaded conveying means.

The automatic manufacturing technology has the following characteristics and advantages.

The application-neutral basic equipment of a manufacturing system, in particular manufacturing devices, are supplemented according to a set plan by application-specific tools and, if necessary, other equipment and adapted to the respective application. Following this combination, the manufacturing facility is ready for production.

Using storage areas, in particular tool magazines, within the manufacturing system, it is also possible to transfer application-specific tool sets that allow for a specific manufacturing sequence on the same workpiece or also permit the production of a mix of types. Furthermore, it is possible to manufacture different workpieces, such as floor components and side walls of vehicle bodies, in the chaotic mix.

By distributing the application-specific tools or tool sets required for the manufacture among a different number of manufacturing systems, the manufacturing times can be variably planned. The entire manufacturing process can be focused on a single manufacturing system if tools and workpieces are introduced and processed in the proper sequence.

The workpieces to be processed are likewise introduced into the production-ready manufacturing systems by the conveying means and are processed. The processed and/or joined workpiece is transported in sequence over a predefined path or a conveyor track through a series of manufacturing systems. The load suspension device (LAM) receives workpieces or workpiece parts that are necessary for the production process, as well as the workpiece processed in the manufacturing system during a completed process. The entire manufacturing sequence can require different load suspension devices.

Each type of load suspension device can be transported in a closed loop. In order to transfer the finished workpiece from loop A to loop B, there are manufacturing systems through which LAM "A" and LAM "B" pass in direct succession. In this way, the workpiece is removed from loop "A" in the manufacturing system and suspended or placed on a repository and processed, if required. The empty conveying means exits the manufacturing system. A different conveying means from loop "B" then enters. Following a completed process, the production part is placed on the conveying means in loop "B" for further transport. Owing to a corresponding number of such transfers, the interlinking conveying technology is ensured throughout the production process.

The workpieces can also be introduced into the manufacturing system with more than one conveying means in sequence. It therefore possible that, in the first step, a conveying means, in particular attachments, enters into the manufacturing system, and the workpieces are removed by robots there and joined to the vehicle body that is supplied on a second conveying means—e.g. lying on a clamping palette. This is advantageous, for instance, during the automated attachment of doors and hatches or when joining the side walls and roof cross-members to a vehicle undercarriage.

The concept permits one and the same manufacturing system to be involved in multiple activities within the manufacturing process. It is also possible to use one and the same manufacturing system of two or more different but synchronous manufacturing processes.

The application-specific tools can be placed in a tool store for service and maintenance purposes, as required. The optimal accessibility and appropriate resources ensure that service is concentrated. The servicing concerns are sensibly controlled integrally by a tool/management software, which has an interface for system control.

The identification of the types of LAMs A, B, C, D can be carried out in different ways, e.g. by an included identifier. The identifier can be detected in or upstream of a manufacturing system. Alternatively or additionally, a type identification can occur by means of control-related communication and message transmission. The workpiece or its type can also be identified by the type identification of a LAM.

Further advantageous embodiments of the invention are indicated in the sub-claims.

Also advantageous are the following embodiments, which can be implemented individually or in combination.

The manufacturing systems can be distributed in a uniform, preferably Cartesian, matrix in the manufacturing zone.

The manufacturing zone and the supplies can be physically separate from each other.

A manufacturing system can have a protective partition surrounding it and a portal for a conveying means.

A loading mechanism of a supply for workpieces and/or tools can have one or more handling robots.

A load suspension device can be configured such that it may be adapted flexibly and in different ways.

BRIEF DESCRIPTION OF THE DRAWINGS

The invention is shown in an exemplary and schematic fashion in the drawings.

DETAILED DESCRIPTION

The invention relates to a manufacturing facility (1) and a manufacturing process for workpieces (2). The invention further relates to a manufacturing system (18-22) for workpieces (2) and production processes running there.

The manufacturing facility (1) and its components, in particular the manufacturing systems (18-22), are automated and program-controlled.

The workpieces (2) can be of any type and size. They can be single-part or multi-part.

They are preferably components of vehicle bodies. The manufacturing facility (1) can be used, for example, for the body shell of vehicle bodies.

The workpieces (2) can be identical or preferably different. The differences can be fundamental and can involve e.g. the type and size. Alternatively, gradual differences can exist, such as differences in type, in particular in the case of vehicle body components. In this case, multiple workpieces (2) are similar to each other, wherein they represent side walls of a vehicle body, for example, and differ from each other in terms of the vehicle type, e.g. limousine with two or four doors, convertible, travel trailer, etc.

In the course of the automatic manufacturing process, one or more workpieces (2) can be processed in a series of manufacturing steps with different production processes. The manufacturing steps are preferably carried out in multiple manufacturing systems (18-22). Alternatively, they can take place in a single manufacturing system (18-22).

The number of manufacturing steps is determined by the process volume, the utilized capacity, rate settings and other criteria. In the case of the body shell, for instance, a manufactured product, in particular a vehicle body assembly, is hereby produced by assembling and joining workpiece components. This can be an intermediate product, from which an end product is created by additional processes, e.g. connecting them to further workpiece components or to intermediate products produced elsewhere. The manufacturing steps are preferably performed in sequence in a plurality of manufacturing systems (18-22). In so doing, one or more process segments are carried out in one manufacturing step.

These production processes can involve different techniques, e.g. joining, in particular welding, soldering or adhering, applying and removing materials, heat treatments, shaping, machining, assembling and installation processes or the like. Furthermore, the production processes can involve the same or different workpieces (2), in particular different workpiece types.

The manufacturing facility (1), the manufacturing process and the manufacturing system (18-22) can be adapted in a flexible and application-specific way. An adaptation to different production processes and/or different workpieces (2) is distinguished by an application specification.

Different application-specific tools (8) are required for these different processes. The tools (8) can differ from one another with respect to the aforementioned different processes. From a standpoint of process technology, the same tools (8) can also differ from each other by virtue of their adaptation to different workpieces (2). The application-specific tools (8) can be individual tools or tool sets.

For the sake of simplicity, the application-specific tools (8) will hereafter be referred to as tools (8).

Figure 1:
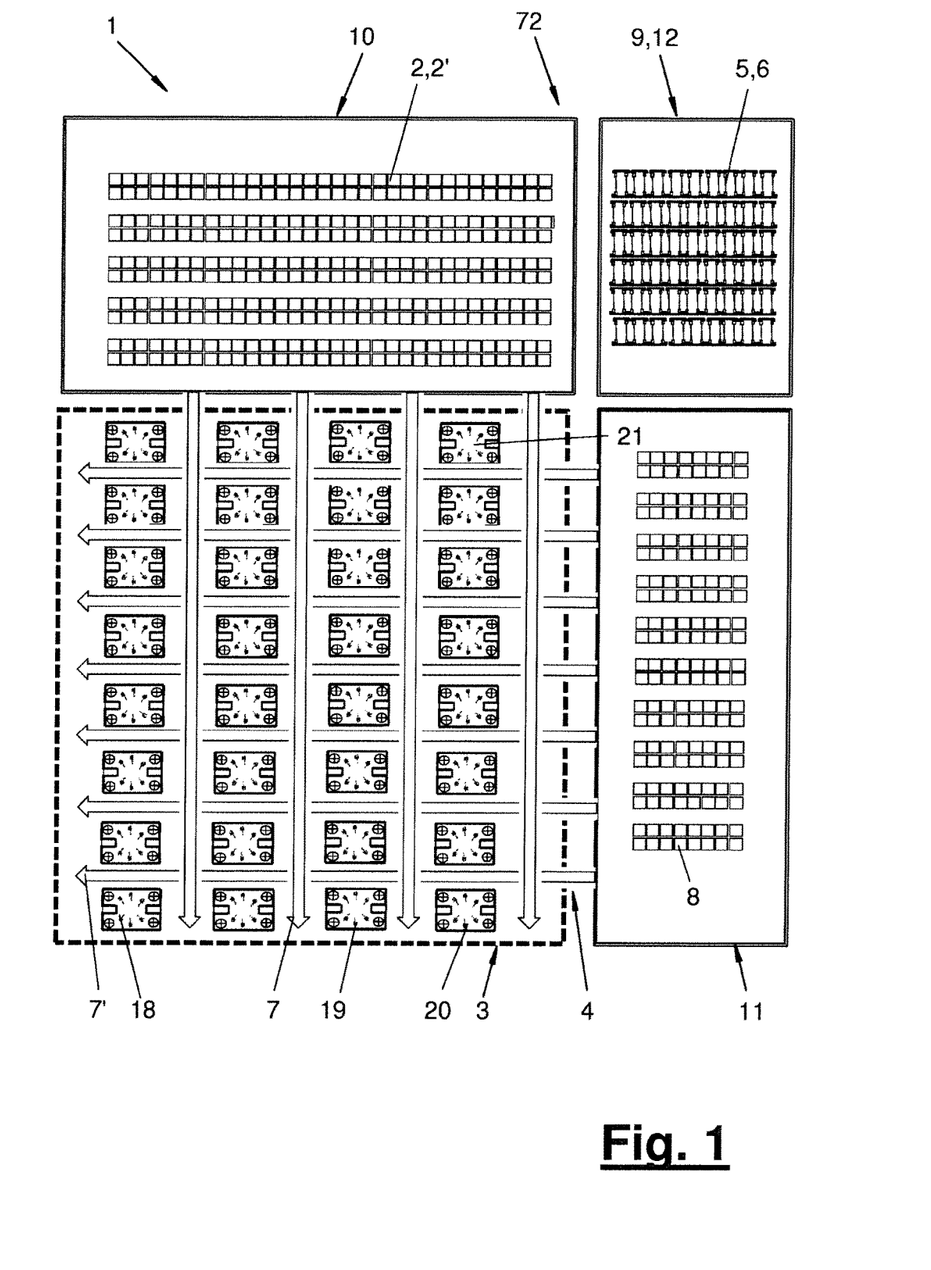
FIG. 1 is a schematic representation of a manufacturing facility with a manufacturing zone and multiple supplies.

FIG. 1 shows a schematic representation of a manufacturing facility (1) and its components. The manufacturing facility (1) comprises a manufacturing zone (3) with a plurality of manufacturing systems (18-22) arranged within it. Moreover, the manufacturing facility (1) has a logistics zone (72). Said zone can include a supply (10) for workpieces (2) and a supply (11) for various aforementioned tools (8). The supplies (10, 11) are also known as the warehouse (10) and the tool store (11).

Furthermore, a conveying mechanism (4) is provided which flexibly links the manufacturing systems (18-22) to one another and to the preferably external supplies (10, 11).

The conveying mechanism (4) can be configured in any desired way. In the embodiments shown, it comprises a multitude of conveying means (5) as well as a multitude of conveying paths (7, 7'), on which the conveying means (5) travel. The conveying paths (7) are preferably arranged in a network.

Each conveying path (7) can extend through a manufacturing system (18-22). Multiple continuous conveying paths (7) can adjoin each other and together form a conveying line (70).

The conveying means (5) can preferably be controlled and steered, if applicable, autonomously and individually. They are configured, for example, as floor-bound driverless transport vehicles, so-called AGVs or FTFs. They can negotiate curves or possibly also turn in place. They can also possibly move omnidirectionally, e.g. by means of Mecanum wheels. Alternatively, the conveying means (5) can be suspended and can move e.g. on elevated conveying rails with diverters. The conveying mechanism (4) can have multiple different conveying means (5).

The conveying means (5) travel in the network of the conveying paths (7, 7') and conveying lines (70, 71) on freely programmable conveyor tracks. The conveying lines (70, 71) can be travelled in opposite directions. They can also be configured as one-way streets with opposing directions of travel indicated by arrows. Using cross-connections, in particular access corridors (66), it is possible to form conveying loops (48, 49) that also create manufacturing loops by interlinking a plurality of manufacturing systems (18-22). The manufacturing and conveying loops (48, 49) can intersect with each other.

At the one or more access corridors (66), the conveying means (5) can continue selectively along the conveying path (7) or conveying line (70) from one manufacturing system (18-22) to the other or it can turn at the cross-connection and travel to another conveying line (71). The turn can be accomplished by a steering movement of the conveying means (5) itself, by a transfer with a turntable or in another way.

A parking zone (53) can be formed in the access corridor (66) or the cross-connection for temporarily stopping an empty or loaded conveying means (5).

In this way, buffer storage areas can be formed to compensate for the differences in cycle times or phases of disruption as well as for sequence recovery or other purposes.

In the various embodiments, each of the conveying means (5) has its own individually controllable drive and its own programmable control system. Power can be supplied in any desired manner, e.g. by means of a stationary or non-stationary power supply system (33). This can be an energy charging path, e.g. an inductive or conductive current supply, which is arranged in one or more suitable locations in the manufacturing facility (1), e.g. on a supply (10, 11) or a manufacturing system (18-22).

For the transport of workpieces (2) and/or tools (8) from the supplies (10, 11) to the manufacturing zone (3) and back and between the manufacturing systems (18-22) within the manufacturing zone (3), each of the conveying means (5) supports one or more adapted load suspension devices (6). Said devices are hereafter referred to as LAMs.

The LAMs (6) can be fixedly or exchangeably attached to a conveying means (5). The LAMs (6) can be permanently adapted for particular workpieces (2) and/or tools (8). Alternatively, they can be configured to be flexibly or adjustably differently adaptable. The LAMs (6) can have various receptacles and retaining means for the workpieces (2) and/or tools (8) and can hold them in a defined position. This permits an automatic transfer and receipt of workpieces (2) and tools (8). The LAMs (6) can have a plate-like or frame-like support as a base, for example.

A plurality of LAMs (6) are configured differently and form different types (A, B, C, D). They can thereby be adapted to different workpieces (2). An adjustable LAM (6) can form two or more different types. The number of different LAM types (A, B, C, D) can be arbitrarily high. It can be two, three, four or more. The number can depend upon the process volume to be completed in the manufacturing facility (1), in particular the number of different workpieces (2). There may be further LAM types for the tools (8).

The LAMs (6) of different types have a type identifier for their respective types (A, B, C, D), which can be detected and recognized by a detection device on the manufacturing systems (18-22). The type identifier can be linked by information and control technology to a particular workpiece (2) and can represent the type of workpiece (2) and/or tool (8).

The manufacturing facility (1) includes a supply (9) for the various LAMs (6), which is connected to the conveying mechanism (4). When there is a permanent link, the LAMs (6) can be stockpiled in the supply (9) along with their conveying means (5). When the connection is detachable, the LAMs (6) per se can be placed in the supply (9), and the separated conveying means (5) can be placed in a separate supply (12).

There can be either one or a plurality of both the manufacturing zone (3) and the supplies (9-12). The supplies (9-12) are preferably arranged separately from one another. They can also be located within or preferably outside of the manufacturing zone (3).

The supplies (9, 10, 11) can be configured identically. This kind of supply (9, 10, 11) can have a storage zone (32) for workpieces (2) and/or tools (8) and/or LAMs (6) as well as a loading zone (30) that has a loading mechanism (31) and is connected to the conveying mechanism (4). The loading mechanism (31) comprises e.g. one or more loading robots, which are stationary or can be displaced by means of a driving axle along a single or a series of conveying means (5) with LAMs (6).

The plurality of manufacturing systems (18-22) are arranged in the manufacturing zone (3) in a linear or planar distribution. Preferably, the manufacturing systems (18-22) are distributed in a uniform, in particular a Cartesian, matrix. The conveying mechanism (4) is designed to relocate at least one type, in particular all types (A, B, C, D), of LAMs (6) on the conveying paths (7, 7') and the conveying lines (70, 71) to and from the manufacturing system(s) (18-22).

The manufacturing systems (18-22) can be surrounded on multiple sides by conveying paths (7). Each conveying path (7) extends into and preferably through a manufacturing system (18-22). The conveying means (5) with the LAMs (6) can thereby travel into and preferably through the individual manufacturing systems (18-22).

The manufacturing systems (18-22) are arranged in the manufacturing zone preferably insularly and mutually spaced apart. They are thus surrounded on all sides by conveying paths (7). Preferably, the manufacturing systems (18-22) are distributed in a uniform, in particular a Cartesian, matrix.

At least some of the manufacturing systems (18-22) are configured identically. Preferably, they are embodied as manufacturing cells (23). Alternatively, a different configuration is possible. A cell-like manufacturing system (18-22) is shown as an example in FIG. 3.

Figure 3:
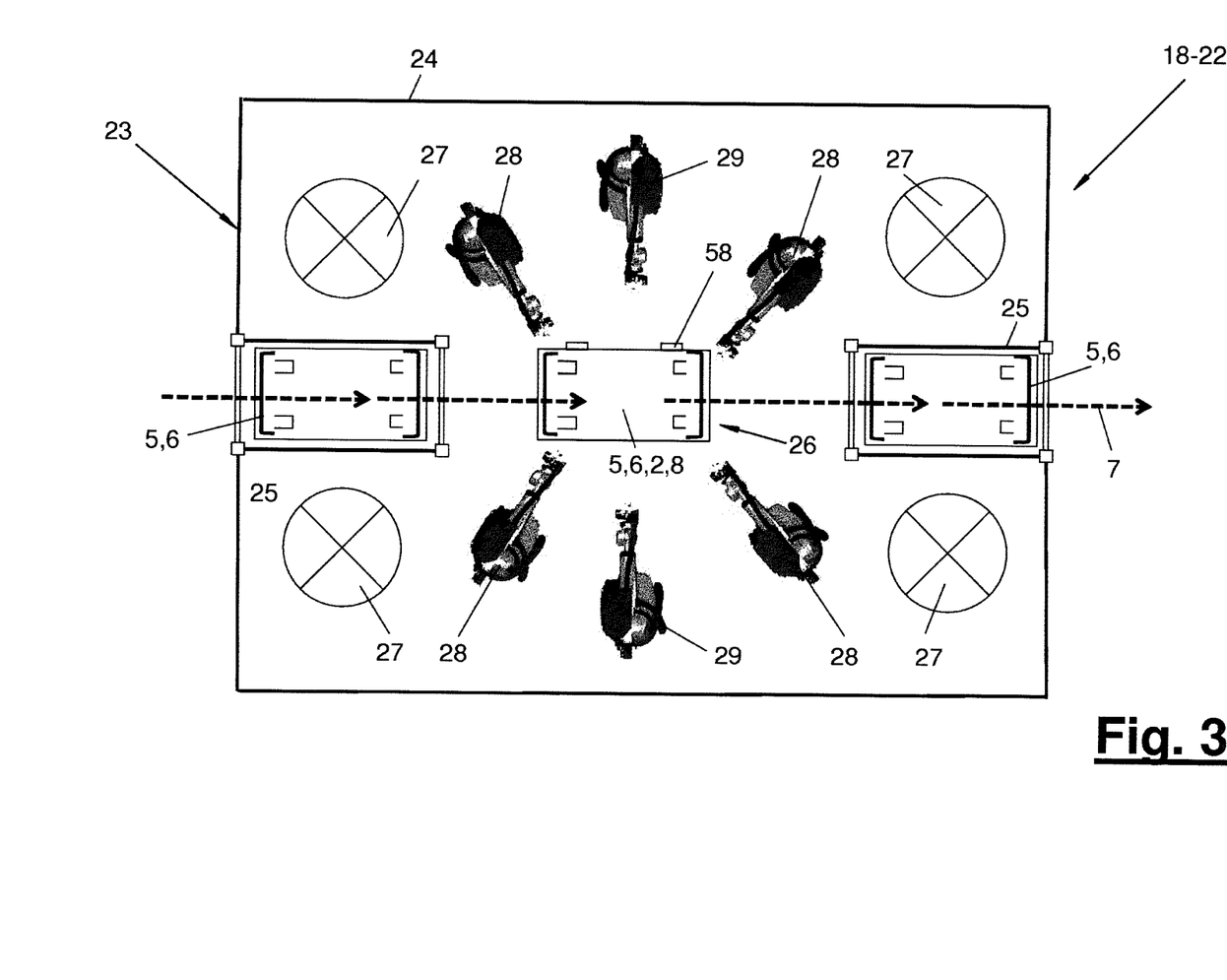
FIG. 3 is a schematic representation of a manufacturing system.

The manufacturing system (18-22) shown, in particular the manufacturing cell (23), functions automatically. It has an individual, preferably central work station (26) and multiple manufacturing devices (28, 29) that can be applied flexibly across applications. Alternatively, a plurality of work stations (26) can be provided. The work station(s) (26) can serve to receive at least two different kinds or types of LAMs (6) in sequence as well as the workpiece (2) and/or tool (8) carried with them.

The manufacturing system (18-22) and its manufacturing devices (28, 29) and any further system components have a basic configuration that is application-neutral and they are adapted to the respective applications by being populated with application-specific tools (8) and being reprogrammed. As a result of this basic configuration and the ability to be populated and adapted, they are flexible across applications.

The work station (26) is located on a preferably straight conveying path (7). This conveying path (7) can be travelled in only one or preferably in both directions. At the work station (26), the manufacturing system (18-22) has a positioning device (58), which is shown schematically in FIG. 3, for positioning the LAM (6) and/or conveying means (5) in accordance with the process. This is following by an exact positioning of one or more entrained workpieces (2) and/or one or more entrained tools (8).

The positioning device (58) can act mechanically upon the LAM (6) and/or the conveying means (5). In other embodiment variants, a positioning device (58) can be formed by markings in the region of the conveying path (7) that can be detected tactilely or touchlessly and that are detected by the conveying means (5) and provide for its program-controlled and self-propelled positioning. In another variant, stops that can pivot into the path of travel can be provided for the longitudinal and lateral positioning of the LAM (6) and/or conveying means (5). A positioning device (58) can also be formed by means of control technology via the programmed control of the conveying means (5) and its integrated path measurement or navigation.

The manufacturing devices (28, 29) can be configured identically or differently, and there can be one or a plurality of each. At least one manufacturing device (29) serves to process a workpiece (2) at the work station (26), in particular on the LAM (6). Additionally, the manufacturing device (29) can also handle a workpiece (2). Preferably, a different additional manufacturing device (28) is employed to handle a workpiece (2).

The manufacturing devices (28, 29) are distributed around the work station (26). In particular, they are disposed to both sides of the work station (26) and the conveying path (7). The manufacturing devices (28, 29) can be stationary or can be displaceable by means of an additional axle. The manufacturing devices (28, 29), which can be used flexibly across applications, are preferably configured as programmable industrial robots with multiple axles. They have an automatic exchange coupling on their drive elements, in particular their hand flanges. In this way, they can automatically receive and use the required tool (8) and, if necessary, automatically release it and change tools. Alternatively, a manufacturing device (29) can be configured in another way, e.g. as a machine tool.

The application-flexible manufacturing devices (28, 29) are provided for various tasks. For example, the manufacturing devices (29) have exchangeable, application-specific tools (8) for performing each respective production process, said tools being configured e.g. as a joining tool, shaping tool or the like. These manufacturing tools (29) are configured as a welding robot, for instance.

The other manufacturing devices (28) likewise carry exchangeable application-specific tools (8) that are configured, for example, to handle the one or more workpieces (2) during the production process. These tools (8) can be gripping tools. The manufacturing tools (28) are configured e.g. as handling robots.

There are six manufacturing devices (28, 29) in the preferred configuration shown in FIG. 3, and they are distributed on both sides of the work station (26). Two manufacturing devices (29) or welding robots are arranged centrally and on both sides of the work station (26) in this case. They are flanked by four processing devices (28) or handling robots arranged on both sides.

The manufacturing system (18-22), in particular the manufacturing cell (23), comprises one or more storage areas (27) for said tools (8). The storage areas (27) can have multiple receiving spaces for various tools (8). They can be driven and controllable. They can be configured as storage carousels, for instance. Each of the storage areas (27) is located in the working zone of a manufacturing device (28, 29). In the embodiment shown, four storage areas (27) are arranged in the corner regions, each of which is associated with a manufacturing device (28) or handling robot.

The manufacturing system (18-22), in particular the manufacturing cell (23) can further comprise one or more control units, supply systems for equipment, in particular electrical power, fluid media or the like, as well as auxiliary systems.

The manufacturing system (18-22), in particular a control unit, can have a storage means for a multitude of application-specific control programs that are adapted to various LAM types (A, B, C, D).

The manufacturing system (18-22) additionally has a detection device for the type identifiers of the LAMs (6). The aforementioned type- and application-specific reprogramming can be carried out on the basis of the detected type identifier.

Moreover, an encompassing protective partition (24), e.g. in the form of a fence, can be provided. One or more portals (25) can be provided in the protective partition (24) for the secured inlet and outlet of a conveying means (5) with LAMs (6) on the conveying path (7).

Figure 8:
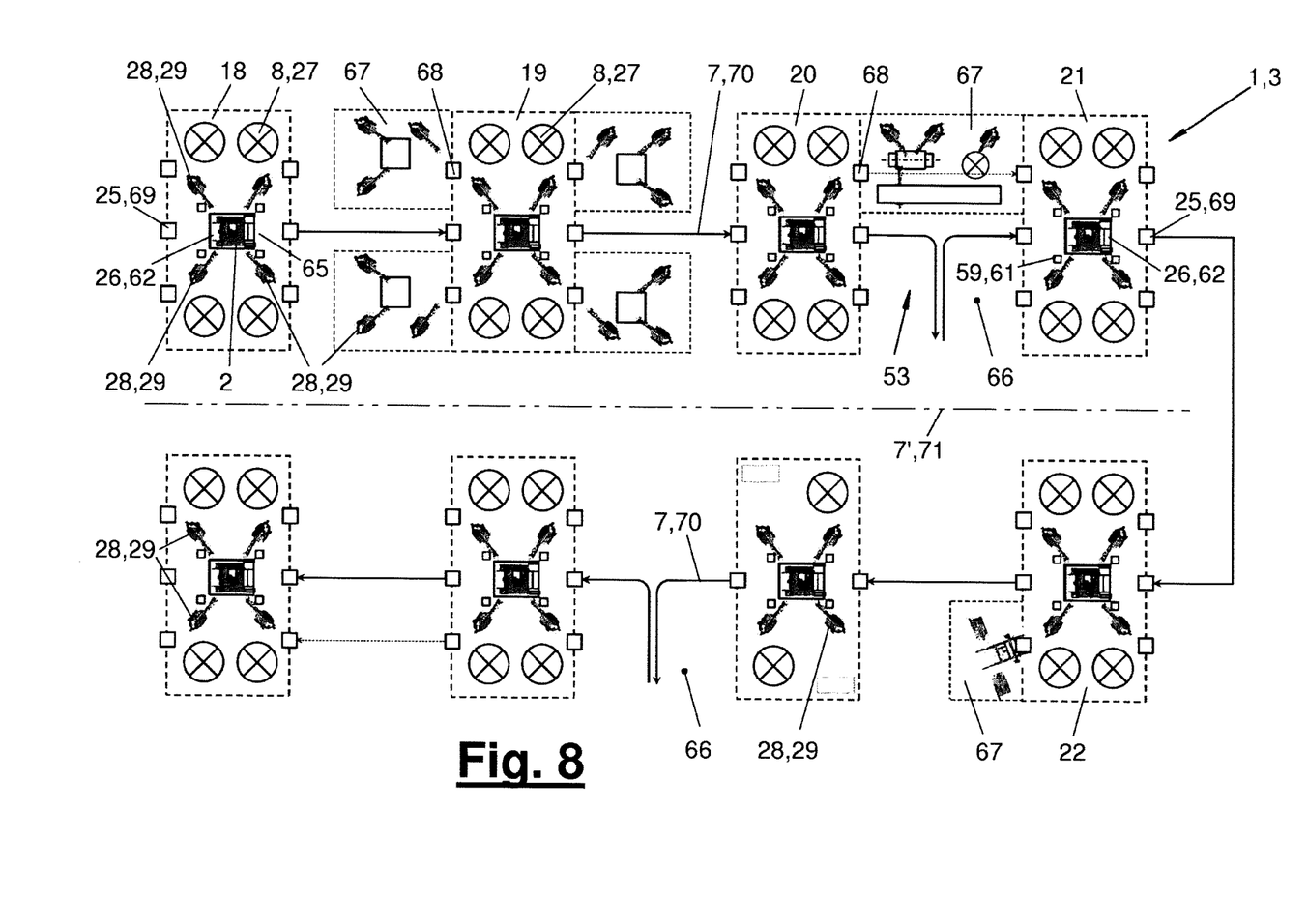

As FIG. 8 makes clear, one or more application-flexible manufacturing systems (18-22) can be linked with a further manufacturing system (67) for a secondary process on a workpiece (2). A multiple arrangement of such manufacturing systems (67) is possible here. They can be arranged laterally next to or else above or below a manufacturing system (18-22). In a further manufacturing system (67), one or more program-controlled manufacturing means, in particular industrial robots, can be provided for handling and processing the workpieces (2) as well as further devices, such as stationary welding tongs, bolt-driving tools, application devices for adhesive, etc.

The primary process(es) carried out in an application-specific manufacturing station (18-22) are preferably geometry-specific to the manufacturing product in question. Such processes can involve e.g. assembling and joining. A joining process can be carried out by adhering (so-called pre-process) or a geometry-determining spot welding or laser welding or with riveting or clinching or the like. The one or more secondary processes in a further manufacturing system (67) can be non-specific to geometry. They can involve e.g. joining, measuring, shaping, cutting or the like. Additional components such as bolts or the like can also be attached during joining. Furthermore, hard-coded secondary processes are possible, such as those involving punching, folding, drilling and/or milling.

The exchange of workpieces between the application-specific manufacturing system (18-22) or the one or more further manufacturing systems (67) can occur via an interface (68), which is arranged e.g. at a passage in the protective partition (24). The further manufacturing zones (67) can likewise be surrounded by a protective partition (24). The exchange of workpieces can be carried out by a program-controlled manufacturing means (28), in particular a handling robot. Further interfaces (69) can be arranged at the inlet of the manufacturing system (18-22) and at the outlet, which is preferably located opposite the inlet, and are formed e.g. by the portals (25).

Figure 2:
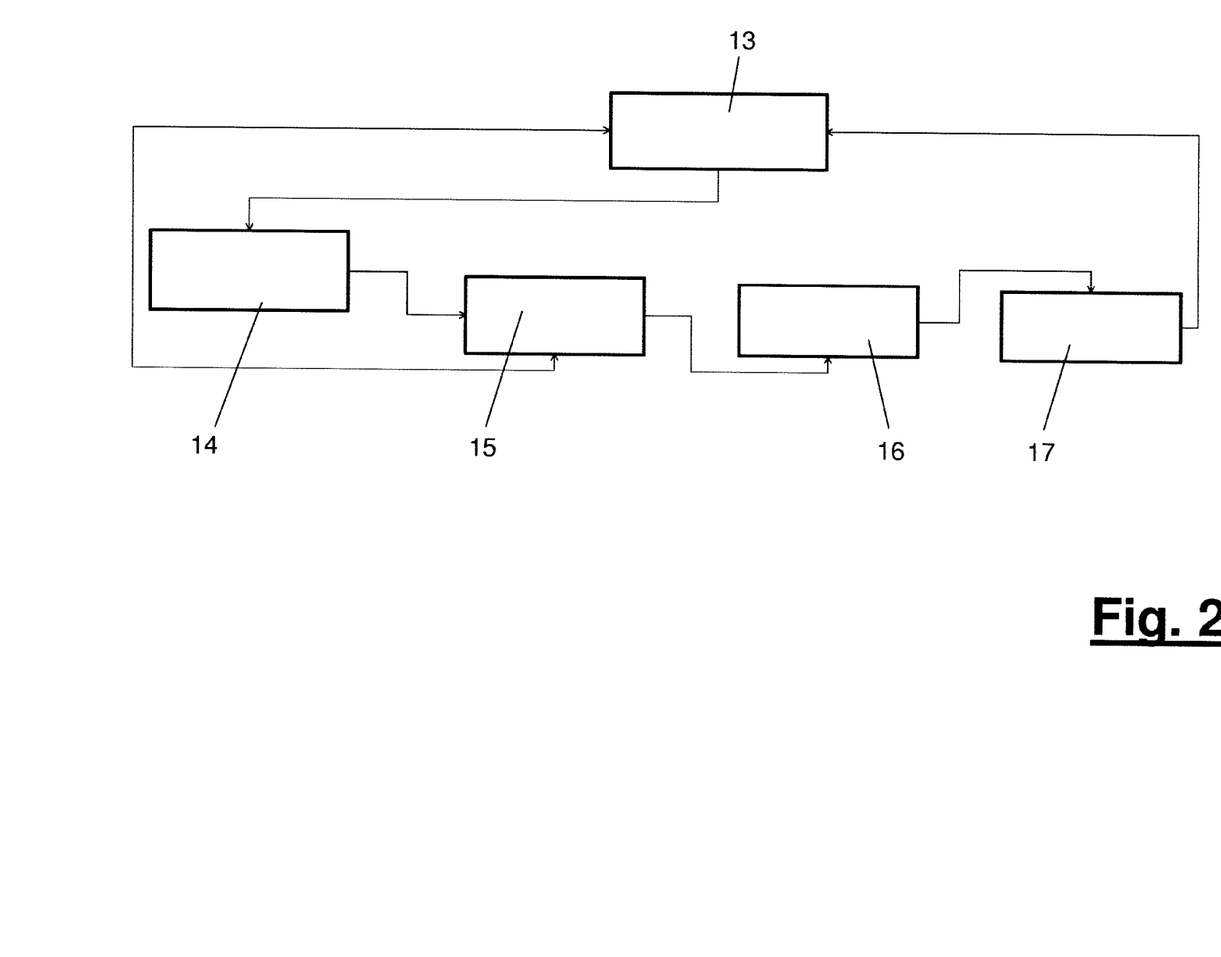
FIG. 2 is a schematic representation of a control hierarchy.

The manufacturing facility (1) has a control system (13), which is linked with control units (14-17) for the manufacturing systems (18-22), the conveying mechanism (4) and the supplies (9, 10, 11). FIG. 2 shows an example of this kind of control architecture. The central facility control system (13) is linked to a control unit (14), a so-called warehouse manager, for the warehouse (10) and the manufacturing system (18-22) and possibly also the conveying mechanism (4).

The warehouse manager contains a warehouse management system for the control of logistics processes from the arrival to the dispatch of goods, for inventory management and inventory, for task management, for a transaction history, for adapting the warehouse configuration by means of administrators and for interfaces to system components of the manufacturing facility (1). Furthermore, the warehouse manager (14) contains a material flow system with a global control system of the automated facility components, in particular the manufacturing systems (18-22) and the conveying mechanism (4), for transport management, for bottleneck and flow control, for optimizing routing and throughput, for integrated troubleshooting over all levels, for coordination with sub-systems, for facility individualization and for a global optimization of material flow.

Moreover, a link is established between the control system (13) and a control unit (15), which is called the tool store manager. There is also a link between the warehouse manager (14) and the tool store manager (15). The tool store manager (15) is concerned with the tool store (11). It includes a tool manager for logistics processes from the arrival to the issuing of tools, for the commissioning of tools for planned productions, for the administration of storage locations and deployment sites, for the control and documentation of maintenance intervals and for a history of all of the tools. Furthermore, the spare components are controlled with respect to inventory control and inventory. The same also applies to the expendable components, so-called consumables, and to a workshop.

The tool store manager (15) is linked with a control unit (16), the so-called fleet manager. Said fleet manager comprises interfaces for logistics and material flow systems and relates to the functions of scheduling, planning and fleet management of the conveying means (5). The warehouse manager (14) also has a link to the fleet manager (16). The fleet manager (16) executes orders from both the warehouse manager (14) and the tool store manager (15).

The fleet manager (16) is linked with a further control unit (17), which is known as the field manager. The field manager is concerned with status control of the operations in the manufacturing facility (1), interfaces for hall and building services engineering as well as interfaces for quality assurance. The field manager (17) is likewise linked with the control system (13).

The aforementioned links between the control system (13) and the control units (14-17) are configured as signal lines. They can be corded or cordless.

The manufacturing facility (1) with the manufacturing zone (3) and the supplies (9-12) as well as the conveying mechanism (4) can be configured in any desired way. In this way, different workpieces (2) can be produced in a parallel operation. This can include the parallel manufacture of left and right side walls, a vehicle roof, a floor assembly or the like. The same also applies to other types of workpieces (2) that are not configured as components of the vehicle body. Furthermore, any desired mix of different types can be manufactured within these parallel manufacturing operations.

All of the manufacturing systems (18-22) can carry out different manufacturing steps. For instance, a separate manufacturing system (18-22) can be provided for every workpiece-related manufacturing step. Moreover, it is possible to perform a manufacturing step for a particular workpiece (2) in parallel in two or more functionally equivalent manufacturing systems (18-22). This can be sensible, for example, in order to balance cycle times of different lengths for different manufacturing steps. In addition, it is possible to decrease or increase the manufacturing capacities and the number of the manufacturing systems (18-22) that are involved.

As a result of the quick application-specific adaptation of the manufacturing facility (1) and in particular the manufacturing systems (18-22), the individual application-related manufacturing jobs of the manufacturing systems (18-22) can be modified flexibly and quickly. The required reconfiguration of the tools as well as the reprogramming and application-specific adaptation of the manufacturing systems (18-22) brought about by it can likewise be carried out very quickly and easily. The conveying mechanism (4) and its conveyor tracks can be modified and reprogrammed just as quickly.

Figure 4:
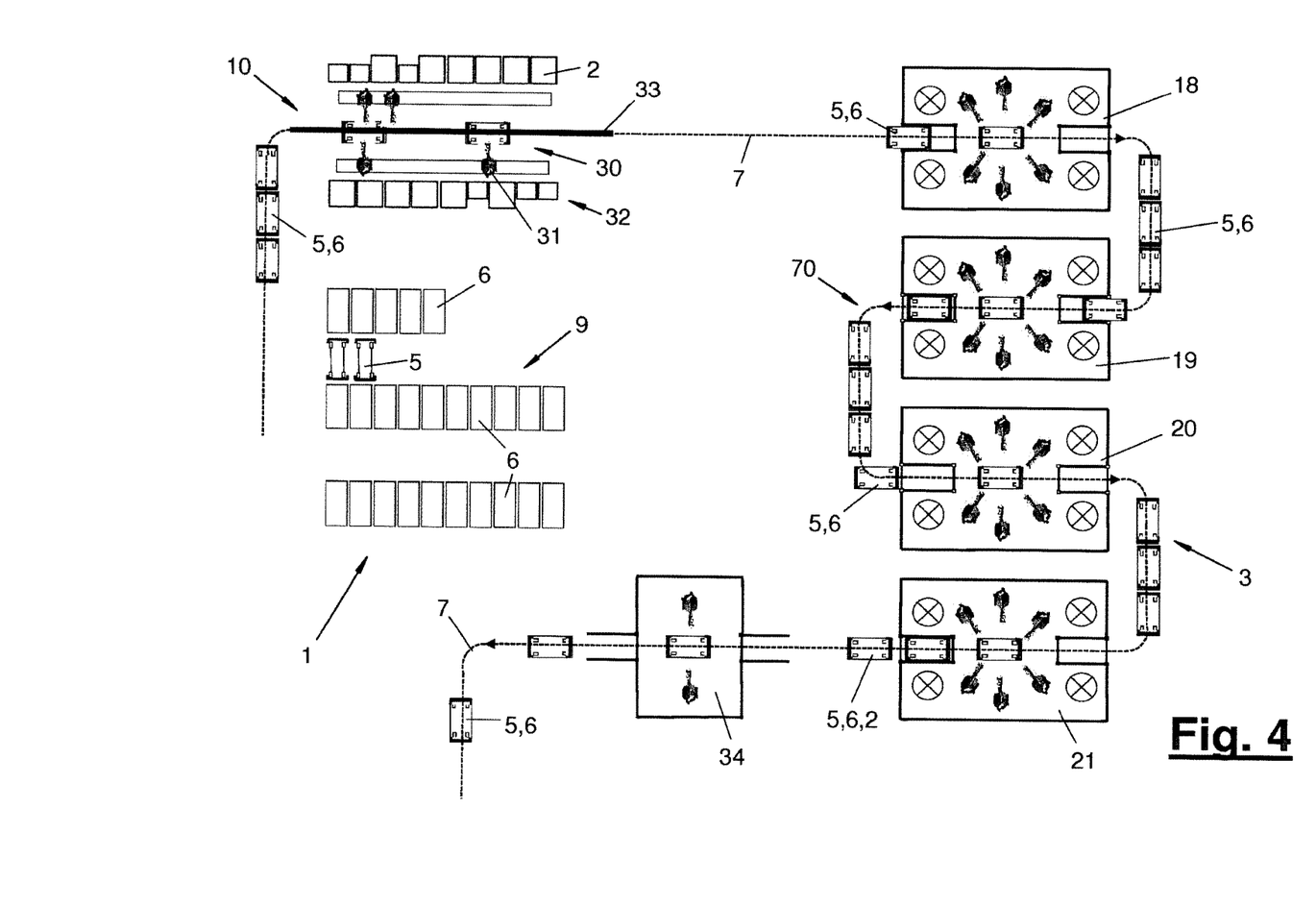
FIG. 4 is an exemplary representation of a manufacturing zone with a plurality of manufacturing systems and supplies.

FIG. 4 illustrates an exemplary configuration of a manufacturing facility (1) with a manufacturing zone (3), in which four manufacturing systems (18-21) are arranged in a row and through which a meandering conveying path (7) passes consecutively. The manufacturing system (18-21) can be configured in the manner according to FIG. 3. After passing through the last manufacturing system (21), the conveying means (5) with the LAM (6) and the finished workpiece (2) can move into a delivery zone (34), in which the workpiece (2) can be unloaded by robots or the like and transferred away from this area of the manufacturing facility (1). It can be brought to an intermediate storage facility or delivered directly to a further manufacturing zone (3).

FIG. 4 also illustrates the warehouse (10), which is upstream of the manufacturing zone (3) and in which the conveying means (5) and LAMs (6) are loaded with one or more workpieces (2) and subsequently driven into the manufacturing zone (3). Additionally, a supply (9) for LAMs (6) and a supply (12) for conveying means (5) are located upstream and are linked to the warehouse (10) and the manufacturing zone (3) via a conveying path (7).

Figure 5:
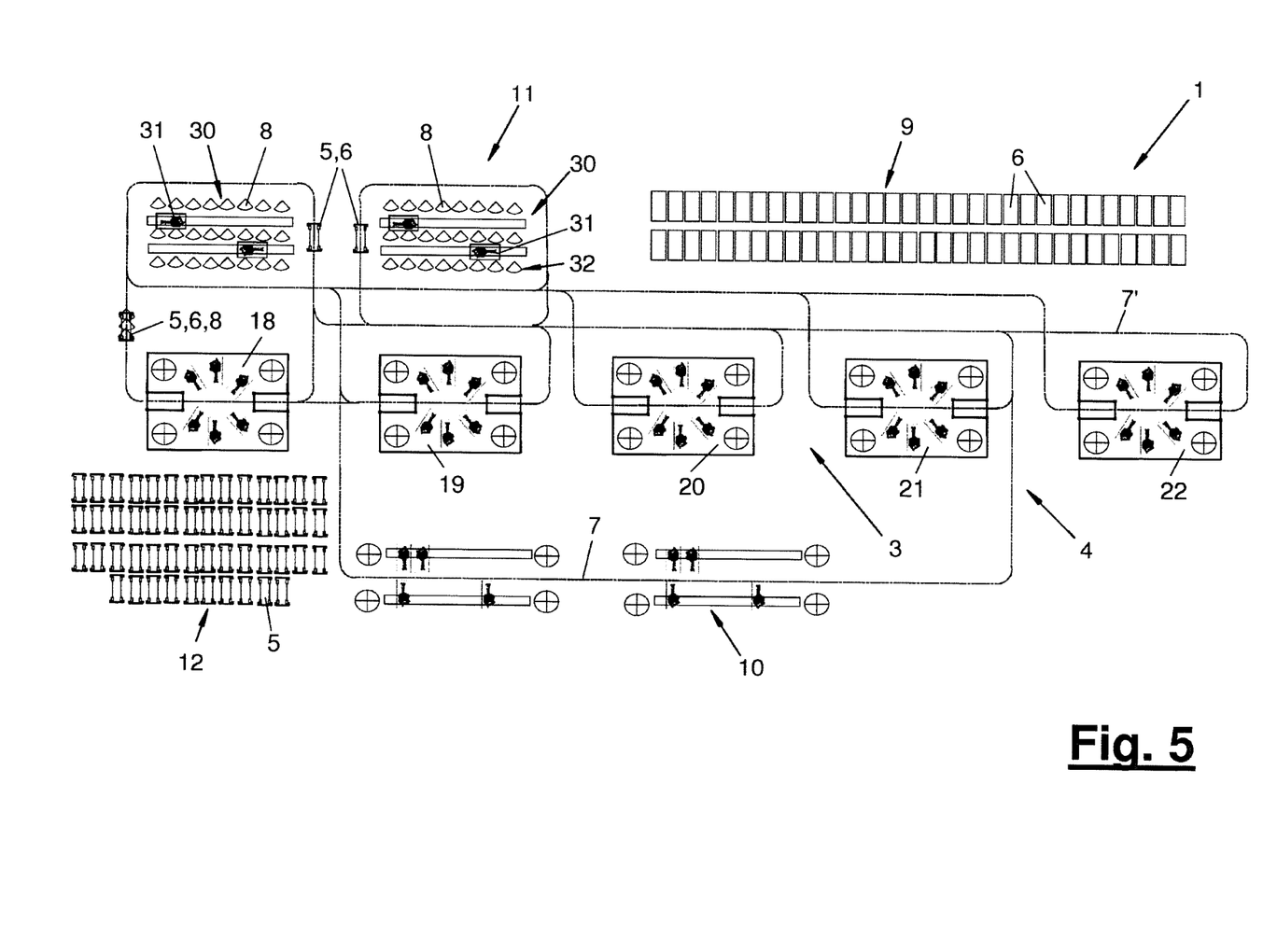
FIG. 5 is a different example of a manufacturing zone with supplies for equipping and switching the tools of the manufacturing system.
Figure 6:
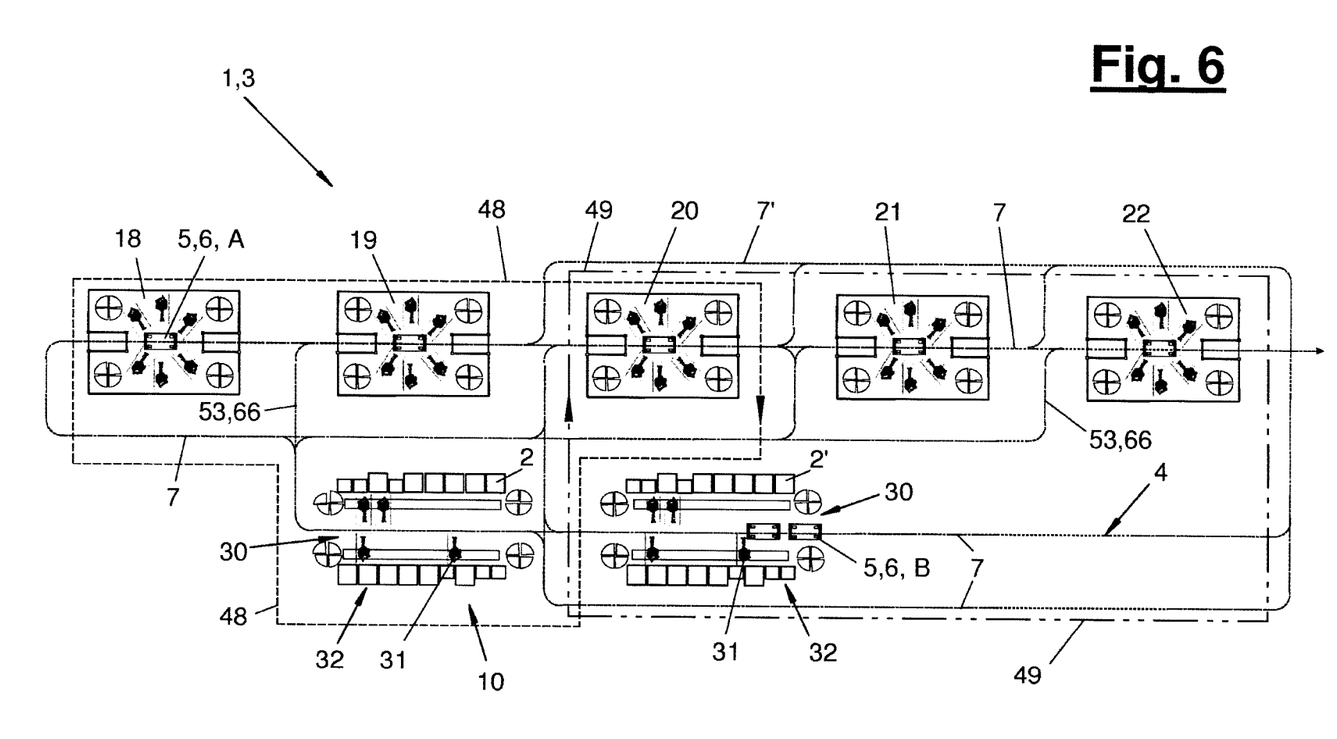
FIG. 6 is a different partial view of the manufacturing zone shown in FIG. 5 for processing with a supply for workpieces.

FIGS. 5 and 6 show examples of a different configuration of the manufacturing facility (1) with a manufacturing zone (3), which has a row of five manufacturing systems (18-22). FIG. 5 thus illustrates the application-specific preparation and equipping of the manufacturing zone (3).

The conveying means (5) from a supply (12) are first loaded with appropriate LAMs (6) and then travel to a tool store (11), which can have one or more loading zones (30). Here, the required application-specific tools (8) are loaded onto the conveying means (5) and LAMs (6), which subsequently travel on programmed conveyor tracks into the respective manufacturing systems (18-22) and there transfer the tools (8) to the manufacturing devices (28, 29) and, if necessary, the storage areas (27). A reprogramming in the control unit of the respective manufacturing system (18-22) is additionally carried out. The equipping can take place in a parallel operation.

The tools (8) can be unloaded in the manufacturing systems (18, 22) by means of the manufacturing devices (28, 29) located there, wherein those tools (8) that are no longer needed are transferred to the conveying means (5) and the LAM (6) during the exchange.

In a different variant that is not shown, a handling mechanism can be arranged on the conveying means (5) and/or the LAM (6) to equip the tools, said mechanism carrying out the tool exchange and the re-equipping with tools (8). This handling mechanism can be a multi-axle robot, for example. Tools (8) and/or other devices can therefore be placed outside of the conveying or passage path (7).

Once a successful application-specific re-tooling or equipping of the manufacturing zone (3) has been completed, the manufacturing process can begin. FIG. 6 illustrates this stage. The various programmed conveyor tracks of the conveying means (5) thus change within the network of conveying paths (7). In FIGS. 5 and 6, said programmed conveyor tracks on the available conveying paths are indicated with reference sign 7.

The warehouse (10), which can likewise have two or more loading zones (30), is linked with the manufacturing zone (3) via the conveying mechanism (4). Depending on the manufacturing process, different workpieces (2) can be transported to the different manufacturing systems (18-22). The manufacturing systems (18-22) can again be configured in the manner according to FIG. 3.

A conveying means (5) with LAMs (6) and a workpiece (2) that is configured e.g. as a component set travels from the left loading zone (3) in FIG. 6 into the first manufacturing system (18). The manufacturing devices (28) or handling robots remove the workpiece components from the LAM (6) by means of suitable tools (8), in particular geo grippers. The manufacturing devices (28) cooperate with each other here and interlock their geo grippers, if necessary, and then present the gripped and tensioned workpiece components to the one or more manufacturing devices (29), in particular welding robots, for joining. At this point, the gripped workpiece components are subjected to laser welding with a remote laser, for example.

If necessary, locked geo grippers are placed in further working positions as a group. Moreover, one or more further workpiece components from one or more manufacturing devices (28) can subsequently be delivered by the LAM (6) as needed and can be added to the already gripped workpiece components.

After the joining process, the workpiece that has been produced is placed back onto the conveying means (5) and/or the LAM (6) and then transported away from the manufacturing system (18). Alternatively, the workpiece (2) as a whole can be removed during the production process, wherein the conveying means (5) with the LAM (6) exits the manufacturing system (18) and a new conveying means (5) with a LAM (6) moves into the manufacturing system (18), wherein the finished workpiece (2) is then deposited here. During this exchange, the finished workpiece (2) can be supplemented with further workpieces or workpiece components, which are delivered on the new LAM (6). The assembled workpiece configuration can then be transported into the next manufacturing system (19). Accordingly, manufacturing processes and workpiece deliveries can also take place in the further manufacturing steps and manufacturing systems (20-22).

It is also possible that a conveying means (5) with a LAM (6) and a workpiece (2) produced in a manufacturing step are initially transported back to the warehouse (10) from a manufacturing system (18) and supplemented there with further workpieces or workpiece components and subsequently transported into the next manufacturing system (19). Corresponding processes can also accompany the further manufacturing steps and manufacturing systems (20-22).

Figure 7:
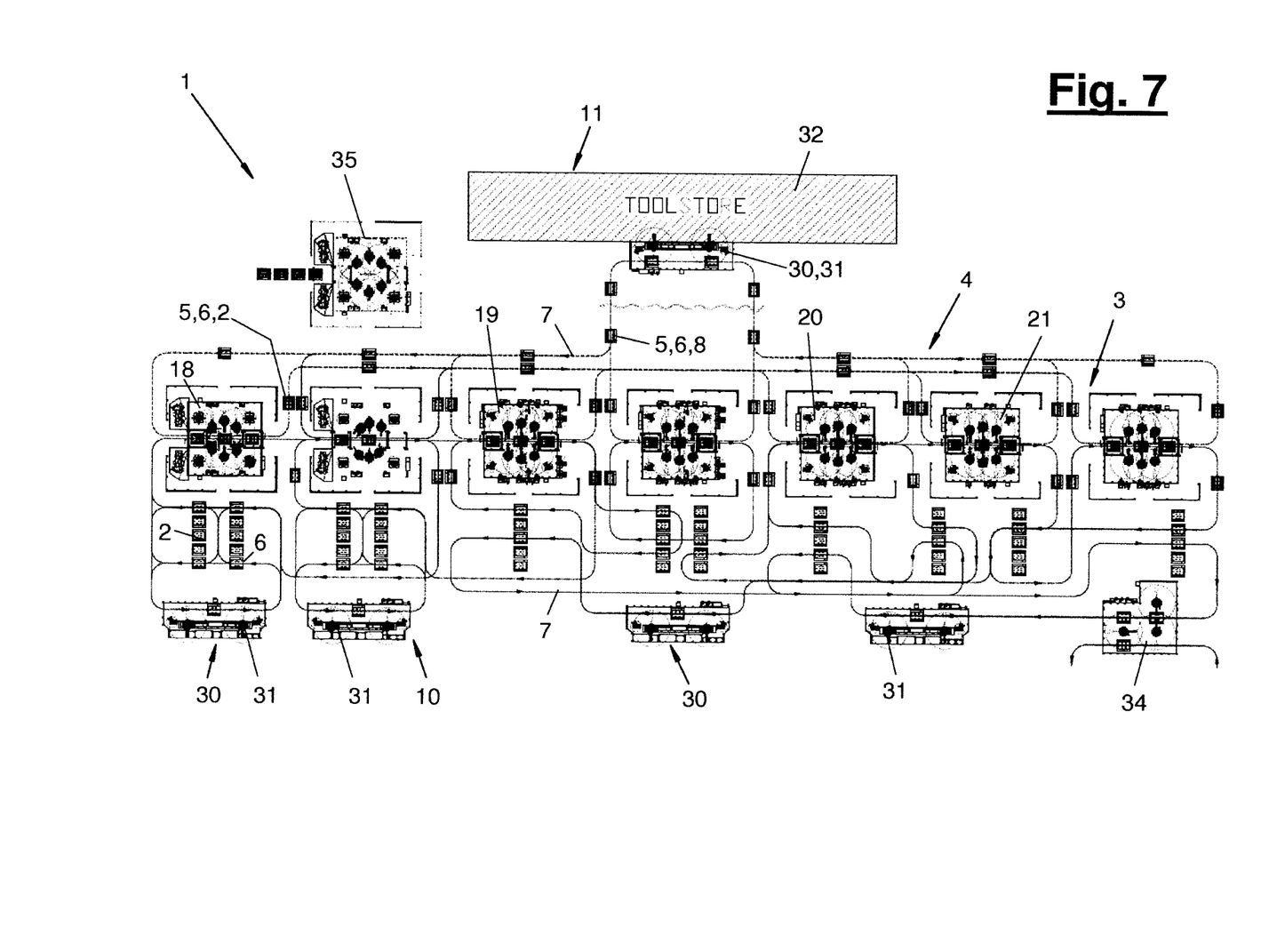
FIG. 7 is a variant of a manufacturing facility and FIG. 8 is a further variant of a manufacturing facility.

FIG. 7 shows a further, more complex configuration of a manufacturing facility (1) with a manufacturing zone (3) of the type described above, a warehouse (10) and a tool store (11). For the sake of clarity, the other supplies (9, 12) are not shown. The warehouse (10) and the tool store (11) can be arranged on opposite sides of the manufacturing zone (3), wherein e.g. a single row of manufacturing systems (18-21) is located. An arrangement such as this has the advantage that the conveying means (7) and the programmed conveyor tracks can be segregated for the tool exchange and for the workpiece supply. Moreover, a variant is presented in which buffer storage areas for loose LAMs (6) with prepared workpiece configurations (2) are assigned to the various loading zones (30) of the warehouse (10). The conveying means (5) used to transport workpieces from and to the manufacturing systems (18-21) then load only the prepared LAMs (6), wherein other conveying means (5) are responsible for equipping the buffer storage area. This ensures particularly fast exchange and equipping times.

Apart from the aforementioned types of application-flexible manufacturing systems (18-22), a manufacturing zone (3) can also have one or more other manufacturing systems (35), which contain e.g. a predetermined complement of tools and a predetermined manufacturing step, which is not or only somewhat flexible. The manufacturing system (35) is shown in this way in FIG. 7. It can be configured as a geo station or framing station for vehicle bodies, for example, and can have a pair of clamping frames that can be exchanged repeatedly and in place, if required.

These inflexible or less flexible manufacturing systems (35) can be employed for particularly large and heavy workpieces or workpiece configurations, for example. Otherwise, they can exhibit the same properties as the application-flexible manufacturing systems (18-22), in particular application-flexible manufacturing devices (28, 29), storage areas (27), etc. Furthermore, they can also be attached to the conveying mechanism (4) and can have a continuous conveying path (7).

Various modifications to the embodiments shown and described are possible. In particular, the features of the different embodiments and their variants can be combined in any given way, including interchanged.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Manufacturing facility
2 Workpiece, vehicle body assembly
3 Manufacturing zone
4 Conveying mechanism, fleet
5 Conveying means, AGV
6 Load suspension device (LAM)
7 Conveying path
7' Conveying path
8 Application-specific tool
9 Supply for load suspension device (LAM)
10 Supply for workpieces, warehouse
11 Supply for tools, tool store
12 Supply for conveying means 13 Control system
14 Control unit, warehouse manager
15 Control unit, tool store manager
16 Control unit, fleet manager
17 Control unit, field manager
18 Manufacturing system
19 Manufacturing system
20 Manufacturing system
21 Manufacturing system
22 Manufacturing system
23 Manufacturing cell, primary process
24 Protective partition
25 Portal
26 Work station
27 Storage area, storage carousel
28 Manufacturing device, robot, handling robot
29 Manufacturing device, robot, welding robot
30 Loading zone
31 Loading mechanism, loading robot
32 Storage zone
33 Power supply system, energy charging path
34 Delivery zone
35 Manufacturing system
36-47
48 Manufacturing loop, type A
49 Manufacturing loop, type B
50-52
53 Parking zone
54-57
58 Positioning device (LAM)
59-65
66 Access corridor
67 Manufacturing system, secondary process
68 Interface
69 Interface
70 Conveying line
71 Conveying line
72 Logistics zone
A type LAM
B type LAM
C type LAM
D type LAM

What is claimed is:

1. A manufacturing facility for workpieces, the manufacturing facility comprising:
 a manufacturing zone comprising a plurality of automatic, program-controlled manufacturing systems;
 a workpiece supply;
 a tool supply configured to supply a plurality of application-specific tools;
 a conveying mechanism flexibly linking the plurality of manufacturing systems to each other and to the workpiece supply and the tool supply;
 wherein the conveying mechanism comprises a plurality of individually controllable conveying means and a network of conveying paths;
 wherein the conveying means travel in the network of the conveying paths on freely programmable conveyor tracks;
 the conveying means comprising autonomous, floor-bound driverless transport vehicles; and
 at least one of the manufacturing systems comprising a plurality of application-flexible manufacturing devices distributed around a work station;
 wherein at least one conveying path extends into the at least one manufacturing system and through the work station.

2. The manufacturing facility of claim 1, wherein:
 the manufacturing systems are configured such that they can be applied flexibly across different applications and such that they can be supplied with workpieces and application-specific tools by the conveying mechanism; and
 the manufacturing systems are adaptable to different manufacturing processes and applications by an automatic exchangeable equipping with different application-specific tools and by modification of operating programs.

3. The manufacturing facility of claim 1, wherein:
 the manufacturing systems in the manufacturing zone are arranged in a linear or planar distribution, and are surrounded on multiple sides by conveying paths of the conveying mechanism.

4. The manufacturing facility of claim 3, wherein the manufacturing systems in the manufacturing zone are arranged in a uniform matrix.

5. The manufacturing facility of claim 4, wherein the manufacturing systems in the manufacturing zone are arranged in a Cartesian matrix.

6. The manufacturing facility of claim 1, wherein a plurality of the manufacturing systems are arranged in a row and are directly linked together by a common, continuous conveying path.

7. The manufacturing facility of claim 1, further comprising a plurality of load suspension devices adapted to support at least one of the workpieces or the application-specific tools.

8. The manufacturing facility of claim 7, wherein the plurality of load suspension devices comprise a plurality of different types of load suspension devices, wherein each type of load suspension device is adapted to different types of workpieces or application-specific tools.

9. The manufacturing facility of claim 8, wherein the different types of load suspension devices have respective type identifiers that are detectable by a detection device and are usable for process adaptation.

10. The manufacturing facility of claim 1, wherein the conveying means are configured to transport adapted load suspension devices, and wherein the load suspension devices are permanently or interchangeably attachable to the conveying means.

11. The manufacturing facility of claim 1, further comprising a load suspension device supply for providing load suspension devices to the manufacturing systems, the load suspension device supply connected to the conveying mechanism.

12. The manufacturing facility of claim 1, wherein at least one supply comprises:
 a storage zone for at least one of workpieces, application-specific tools, or load suspension devices; and
 a loading area connected to the conveying mechanism, the loading area including a loading mechanism.

13. The manufacturing facility of claim 1, wherein at least one manufacturing system comprises:
 a plurality of storage areas for application-specific tools located in a working zone of a respective manufacturing device; and
 the storage areas having a plurality of receiving spaces for receiving various tools therein.

14. The manufacturing facility of claim 13, wherein at least one of:
 the plurality of storage areas comprise storage carousels; or
 the manufacturing devices comprise handling robots.

15. The manufacturing facility of claim 1, wherein a first one of the plurality of manufacturing systems is configured to carry out a primary manufacturing process on a workpiece and is linked with a second one of the plurality manufacturing systems that is configured to carry out a secondary manufacturing process on the workpiece.

16. A program-controlled automatic manufacturing system for workpieces, comprising:
a plurality of manufacturing devices distributed around a work station;
wherein the manufacturing system is configured to be applied flexibly across manufacturing applications and the manufacturing devices comprise automatic exchange couplings and application-specific tools;
the manufacturing system being configurable to different production processes by automatic changeable equipping of the manufacturing devices with different application-specific tools and by modification of operating programs; and
a plurality of storage areas for application-specific tools located in a working zone of at least one manufacturing device;
the manufacturing system operatively communicating with a conveying mechanism that flexibly links the manufacturing system to a plurality of other manufacturing systems and to a workpiece supply and a tool supply, the conveying mechanism comprising a plurality of individually controllable conveying means and a network of conveying paths, the conveying means comprising autonomous, floor-bound driverless transport vehicles;
wherein at least one conveying path extends into the at least one manufacturing system and through the work station.

17. The manufacturing system of claim 16, wherein at least one of:
the plurality of storage areas comprise storage carousels; or
the manufacturing devices comprise handling robots.

18. The manufacturing system of claim 16, wherein the manufacturing system is configured as a manufacturing cell into which or through which a conveying path of a conveying mechanism extends, wherein the conveying path is floor-bound and is configured for an autonomous, driverless transport vehicle.

19. The manufacturing system of claim 16, further comprising at least one of:
a positioning device at the work station for a conveying means; or
a load suspension device at the work station.

20. The manufacturing system of claim 16, wherein the manufacturing system is configured to carry out a primary manufacturing process on a workpiece and is linked with a further manufacturing system that is configured to carry out a secondary manufacturing process on the workpiece.

21. A method for manufacturing workpieces in a manufacturing facility having a manufacturing zone with a plurality of automatic, program-controlled manufacturing systems and a supply for providing the workpieces, the method comprising:
providing various application-specific tools in a tool supply of the manufacturing facility; and
flexibly linking the manufacturing systems to each other and to the workpiece supply and the tool supply by a conveying mechanism comprising a plurality of individually controllable conveying means and a network of conveying paths;
the conveying means comprising autonomous, floor-bound driverless transport vehicles;
wherein at least one of the manufacturing systems comprises a plurality of application-flexible manufacturing devices distributed around a work station; and
wherein at least one conveying path extends into the at least one manufacturing system and through the work station.

22. The method of claim 21, further comprising:
transporting at least one of the workpieces or the application-specific tools by individually controllable conveying means of the conveying mechanism on a network of conveying paths, wherein the conveying means travel on freely programmable conveyor tracks.

23. The method of claim 21, further comprising:
transporting at least one of the workpieces or the application-specific tools by adapted load suspension devices on conveying means of the conveying mechanism.

24. The method of claim 23, wherein the load suspension devices comprise a plurality of different types of load suspension devices configured to accommodate a respective plurality of different types of workpieces.

25. The manufacturing facility of claim 1, wherein at least one manufacturing system comprises:
a protective partition enclosing the manufacturing system; and
at least one portal in the protective partition and configured for the secure inlet and outlet of a conveying means on the conveying path extending into the at least one manufacturing system.

* * * * *